US012087241B2

(12) United States Patent
Xu

(10) Patent No.: US 12,087,241 B2
(45) Date of Patent: Sep. 10, 2024

(54) LIGHT EMITTING CIRCUIT HAVING BISTABLE CIRCUIT MODULE FOR CHANGING POTENTIAL OF GATE OF DRIVING TRANSISTOR, BACKLIGHT MODULE AND DISPLAY PANEL

(71) Applicant: SHENZHEN CHINA STAR OPTOELECTRONICS SEMICONDUCTOR DISPLAY TECHNOLOGY CO., LTD., Guangdong (CN)

(72) Inventor: Jian Xu, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/623,590

(22) PCT Filed: Dec. 23, 2021

(86) PCT No.: PCT/CN2021/140753
§ 371 (c)(1),
(2) Date: Dec. 28, 2021

(87) PCT Pub. No.: WO2023/115444
PCT Pub. Date: Jun. 29, 2023

(65) Prior Publication Data

US 2024/0038179 A1 Feb. 1, 2024

(30) Foreign Application Priority Data

Dec. 20, 2021 (CN) ......................... 202111566798.2

(51) Int. Cl.
*G09G 3/30* (2006.01)
*G09G 3/32* (2016.01)
*G09G 3/34* (2006.01)

(52) U.S. Cl.
CPC ............. *G09G 3/3406* (2013.01); *G09G 3/32* (2013.01); *G09G 2300/0852* (2013.01); *G09G 2310/08* (2013.01)

(58) Field of Classification Search
CPC .................. G09G 3/3406; G09G 3/32; G09G 2300/0852; G09G 2310/08
See application file for complete search history.

(56) References Cited

U.S. PATENT DOCUMENTS

2002/0089496 A1* 7/2002 Numao ................ G09G 3/3648 345/204
2002/0140642 A1 10/2002 Okamoto
(Continued)

FOREIGN PATENT DOCUMENTS

CN 102792363 A 11/2012
CN 103490748 A 1/2014
(Continued)

OTHER PUBLICATIONS

International Search Report in International application No. PCT/CN2021/140753,mailed on Sep. 15, 2022.
(Continued)

*Primary Examiner* — Sanghyuk Park
(74) *Attorney, Agent, or Firm* — PV IP PC; Wei Te Chung

(57) ABSTRACT

The present application discloses a light emitting circuit, a backlight module and a display panel. The light emitting circuit includes a light emitting device, a driving transistor, a data signal writing module, a first control module, a bistable circuit module, and a second control module. The
(Continued)

first control module, the bistable circuit module, and the second control module work together to control a potential reversal of a gate of the driving transistor. By setting a bistable circuit module in the light emitting circuit, the present application can quickly change the potential of the gate of the driving transistor, so as to accurately control the luminous time of the light emitting device.

20 Claims, 5 Drawing Sheets

(56) References Cited

U.S. PATENT DOCUMENTS

| | | | | |
|---|---|---|---|---|
| 2008/0291138 | A1 | 11/2008 | Yamashita | |
| 2019/0156755 | A1* | 5/2019 | Miyasaka | G09G 3/3233 |
| 2019/0189051 | A1* | 6/2019 | Miyasaka | G09G 3/2022 |
| 2019/0287459 | A1* | 9/2019 | Liu | G09G 3/3233 |

FOREIGN PATENT DOCUMENTS

| | | | |
|---|---|---|---|
| CN | 104299570 | A | 1/2015 |
| CN | 108831384 | A | 11/2018 |
| CN | 109801592 | A | 5/2019 |
| CN | 210142495 | U | 3/2020 |
| CN | 111477162 | A | 7/2020 |
| CN | 111583857 | A | 8/2020 |
| CN | 113689821 | A | 11/2021 |
| CN | 113808547 | A | 12/2021 |
| CN | 114762031 | A | 7/2022 |
| JP | 2009049859 | A | 3/2009 |

OTHER PUBLICATIONS

Written Opinion of the International Search Authority in International application No. PCT/CN2021/140753, mailed on Sep. 15, 2022.

Chinese Office Action issued in corresponding Chinese Patent Application No. 202111566798.2 dated Sep. 5, 2022, pp. 1-6.

* cited by examiner

LIGHT EMITTING CIRCUIT HAVING BISTABLE CIRCUIT MODULE FOR CHANGING POTENTIAL OF GATE OF DRIVING TRANSISTOR, BACKLIGHT MODULE AND DISPLAY PANEL

BACKGROUND

Field of Invention

The present application relates to the display field, and particularly to a light emitting circuit, a backlight module and a display panel.

Description of Prior Art

Light emitting devices such as MiniLED, MicroLED and OLED have the advantages of high brightness, high contrast and high color gamut. At present, they have been widely used in the field of high-performance display. At present, the common driving modes of LED display technology include pulse amplitude modulation (PAM), pulse width modulation (PWM), and their hybrid.

PWM driving mode has the advantages of constant current, high luminous efficiency of light emitting devices, low gray-scale display and good image quality. Therefore, PWM and hybrid drive display based on PWM have been widely studied. However, in the existing PWM driving mode, it is difficult to accurately control the luminous time of the light emitting device in the light emitting circuit.

SUMMARY

The present application provides a light emitting circuit, a backlight module and a display panel, so as to solve the technical problem that it is difficult to accurately control the luminous time of the light emitting device in the existing light emitting circuit.

The present application provides a light emitting circuit, comprising:

- a driving transistor, wherein one of a source and a drain of the driving transistor is configured to receive a first power signal;
- a light emitting device, comprising a first end electrically connected to the other of the source and the drain of the driving transistor, wherein a second end of the light emitting device is configured to receive a second power signal;
- a data signal writing module, configured to receive a scan signal and a data signal and electrically connected to a gate of the driving transistor, wherein the data signal writing module is configured to write the data signal to the gate of the driving transistor under the control of the scan signal;
- a first control module, configured to receive a control signal, a first voltage signal, and a second voltage signal and electrically connected to a first node, wherein the first control module is configured to control a potential of the first node under the control of the control signal, the first voltage signal, and the second voltage signal;
- a bistable circuit module, configured to receive the first power signal and a third power signal and electrically connected to the first node and a second node, wherein the bistable circuit module is configured to control a potential of the second node under the control of the potential of the first node, the first power signal, and the third power signal;
- a second control module, configured to receive the third power signal and electrically connected to the second node and the gate of the driving transistor, wherein the second control module is configured to control a potential of the gate of the driving transistor under the control of the potential of the second node, and the third power signal;
- a storage module, electrically connected to the gate of the driving transistor and the second end of the light emitting device, wherein the storage module is configured to maintain the potential of the gate of the driving transistor.

Alternatively, in some embodiments of the present application, the data signal writing module comprises a first transistor, a gate of the first transistor is configured to receive the scan signal, one of a source and a drain of the first transistor is configured to receive the data signal, and the other of the source and the drain of the first transistor is electrically connected to the gate of the driving transistor;

- wherein, the storage module comprises a storage capacitor, an end of the storage capacitor is electrically connected to the gate of the driving transistor, and another end of the storage capacitor is electrically connected to the second end of the light emitting device.

Alternatively, in some embodiments of the present application, the data signal writing module comprises a first transistor, a gate of the first transistor is configured to receive the scan signal, one of a source and a drain of the first transistor is configured to receive the data signal, and the other of the source and the drain of the first transistor is electrically connected to the gate of the driving transistor;

- wherein, the storage module comprises a storage capacitor, an end of the storage capacitor is electrically connected to the gate of the driving transistor, and another end of the storage capacitor is electrically connected to the second end of the light emitting device.

Alternatively, in some embodiments of the present application, the first control module comprises a second transistor and a first capacitor;

- wherein a gate of the second transistor is configured to receive the control signal, one of a source and a drain of the second transistor is configured to receive the first voltage signal, the other of the source and the drain of the second transistor and one end of the first capacitor are electrically connected to the first node, and another end of the first capacitor is configured to receive the second voltage signal.

Alternatively, in some embodiments of the present application, the bistable circuit module comprises a first inverter and a second inverter;

- wherein the first inverter comprises a third transistor and a fourth transistor, a gate of the third transistor and one of a source and a drain of the third transistor are configured to receive the first power signal, the other of the source and the drain of the third transistor and one of a source and a drain of the fourth transistor are electrically connected to the second node, a gate of the fourth transistor is electrically connected to the first node, and the other of the source and the drain of the fourth transistor is configured to receive the third power signal;

wherein the second inverter comprises a fifth transistor and a sixth transistor, a gate of the fifth transistor and one of a source and a drain of the fifth transistor are configured to receive the first power signal, the other of the source and the drain of the fifth transistor and one of a source and a drain of the sixth transistor are electrically connected to the first node, a gate of the sixth transistor is electrically connected to the second node, and the other of the source and the drain of the sixth transistor is configured to receive the third power signal.

Alternatively, in some embodiments of the present application, a channel aspect ratio of the third transistor is less than that of the fourth transistor, and a channel aspect ratio of the fifth transistor is less than that of the sixth transistor.

Alternatively, in some embodiments of the present application, the bistable circuit module comprises a first inverter and a second inverter;

wherein the first inverter comprises a third transistor and a fourth transistor, a gate of the third transistor and a gate of the fourth transistor are electrically connected to the first node, and one of a source and a drain of the third transistor is configured to receive the first power signal, the other of the source and the drain of the third transistor and one of a source and a drain of the fourth transistor are electrically connected to the second node, and the other of the source and the drain of the fourth transistor is configured to receive the third power signal;

wherein the second inverter comprises a fifth transistor and a sixth transistor, a gate of the fifth transistor and a gate of the sixth transistor are electrically connected to the second node, and one of a source and a drain of the fifth transistor is configured to receive the first power signal, the other of the source and the drain of the fifth transistor and one of a source and a drain of the sixth transistor are electrically connected to the first node, and the other of the source and the drain of the sixth transistor is configured to receive the third power signal;

wherein the third transistor and the fifth transistor are P-type transistors, and the fourth transistor and the sixth transistor are N-type transistors.

Alternatively, in some embodiments of the present application, the second control module comprises a seventh transistor, wherein a gate of the seventh transistor is electrically connected to the second node, one of a source and a drain of the seventh transistor is configured to receive the third power signal, and the other of the source and the drain of the seventh transistor is electrically connected to the gate of the driving transistor.

Alternatively, in some embodiments of the present application, the light emitting circuit further comprises a sensing module configured to receive a sense signal and electrically connected to the other of the source and the drain of the driving transistor and a initial voltage input terminal, wherein the sensing module is configured to sense a threshold voltage of the driving transistor under the control of the sense signal.

Alternatively, in some embodiments of the present application, the sensing module comprises an eighth transistor, wherein a gate of the eighth transistor is configured to receive the sense signal, one of a source and a drain of the eighth transistor is electrically connected to one of the source and the drain of the driving transistor, and the other of the source and the drain of the eighth transistor is electrically connected to the initial voltage input terminal.

Alternatively, in some embodiments of the present application, the second voltage signal is a triangular wave signal.

Accordingly, the present application also provides a backlight module, comprising:

a data line for providing a data signal;
a scan line for providing a scan signal;
a control line for providing a control signal;
a first signal line for providing a first voltage signal;
a second signal line for providing a second voltage signal;
a first power line for providing a first power signal;
a second power line for providing a second power signal;
a third power line for providing a third power signal; and
a light emitting circuit, comprising:

a driving transistor, wherein one of a source and a drain of the driving transistor is configured to receive the first power signal;

a light emitting device, comprising a first end electrically connected to the other of the source and the drain of the driving transistor, wherein a second end of the light emitting device is configured to receive the second power signal;

a data signal writing module, configured to receive the scan signal and the data signal and electrically connected to a gate of the driving transistor, wherein the data signal writing module is configured to write the data signal to the gate of the driving transistor under the control of the scan signal;

a first control module, configured to receive the control signal, the first voltage signal, and the second voltage signal and electrically connected to a first node, wherein the first control module is configured to control a potential of the first node under the control of the control signal, the first voltage signal, and the second voltage signal;

a bistable circuit module, configured to receive the first power signal and the third power signal and electrically connected to the first node and a second node, wherein the bistable circuit module is configured to control a potential of the second node under the control of the potential of the first node, the first power signal, and the third power signal;

a second control module, configured to receive the third power signal and electrically connected to the second node and the gate of the driving transistor, wherein the second control module is configured to control a potential of the gate of the driving transistor under the control of the potential of the second node, and the third power signal;

a storage module, electrically connected to the gate of the driving transistor and the second end of the light emitting device, wherein the storage module is configured to maintain the potential of the gate of the driving transistor.

Alternatively, in some embodiments of the present application, the data signal writing module comprises a first transistor, a gate of the first transistor is configured to receive the scan signal, one of a source and a drain of the first transistor is configured to receive the data signal, and the other of the source and the drain of the first transistor is electrically connected to the gate of the driving transistor;

wherein, the storage module comprises a storage capacitor, an end of the storage capacitor is electrically connected to the gate of the driving transistor, and another end of the storage capacitor is electrically connected to the second end of the light emitting device.

Alternatively, in some embodiments of the present application, the first control module comprises a second transistor and a first capacitor;

wherein a gate of the second transistor is configured to receive the control signal, one of a source and a drain of the second transistor is configured to receive the first voltage signal, the other of the source and the drain of the second transistor and one end of the first capacitor are electrically connected to the first node, and another end of the first capacitor is configured to receive the second voltage signal.

Alternatively, in some embodiments of the present application, the bistable circuit module comprises a first inverter and a second inverter;

wherein the first inverter comprises a third transistor and a fourth transistor, a gate of the third transistor and one of a source and a drain of the third transistor are configured to receive the first power signal, the other of the source and the drain of the third transistor and one of a source and a drain of the fourth transistor are electrically connected to the second node, a gate of the fourth transistor is electrically connected to the first node, and the other of the source and the drain of the fourth transistor is configured to receive the third power signal;

wherein the second inverter comprises a fifth transistor and a sixth transistor, a gate of the fifth transistor and one of a source and a drain of the fifth transistor are configured to receive the first power signal, the other of the source and the drain of the fifth transistor and one of a source and a drain of the sixth transistor are electrically connected to the first node, a gate of the sixth transistor is electrically connected to the second node, and the other of the source and the drain of the sixth transistor is configured to receive the third power signal.

Alternatively, in some embodiments of the present application, a channel aspect ratio of the third transistor is less than that of the fourth transistor, and a channel aspect ratio of the fifth transistor is less than that of the sixth transistor.

Alternatively, in some embodiments of the present application, the bistable circuit module comprises a first inverter and a second inverter;

wherein the first inverter comprises a third transistor and a fourth transistor, a gate of the third transistor and a gate of the fourth transistor are electrically connected to the first node, and one of a source and a drain of the third transistor is configured to receive the first power signal, the other of the source and the drain of the third transistor and one of a source and a drain of the fourth transistor are electrically connected to the second node, and the other of the source and the drain of the fourth transistor is configured to receive the third power signal;

wherein the second inverter comprises a fifth transistor and a sixth transistor, a gate of the fifth transistor and a gate of the sixth transistor are electrically connected to the second node, and one of a source and a drain of the fifth transistor is configured to receive the first power signal, the other of the source and the drain of the fifth transistor and one of a source and a drain of the sixth transistor are electrically connected to the first node, and the other of the source and the drain of the sixth transistor is configured to receive the third power signal;

wherein the third transistor and the fifth transistor are P-type transistors, and the fourth transistor and the sixth transistor are N-type transistors.

Accordingly, the present application also provides a display panel, comprising a plurality of pixel units arranged in an array, wherein, each pixel unit comprises a light emitting circuit, and the light emitting circuit comprises:

a driving transistor, wherein one of a source and a drain of the driving transistor is configured to receive a first power signal;

a light emitting device, comprising a first end electrically connected to the other of the source and the drain of the driving transistor, wherein a second end of the light emitting device is configured to receive a second power signal;

a data signal writing module, configured to receive a scan signal and a data signal and electrically connected to a gate of the driving transistor, wherein the data signal writing module is configured to write the data signal to the gate of the driving transistor under the control of the scan signal;

a first control module, configured to receive a control signal, a first voltage signal, and a second voltage signal and electrically connected to a first node, wherein the first control module is configured to control a potential of the first node under the control of the control signal, the first voltage signal, and the second voltage signal;

a bistable circuit module, configured to receive the first power signal and a third power signal and electrically connected to the first node and a second node, wherein the bistable circuit module is configured to control a potential of the second node under the control of the potential of the first node, the first power signal, and the third power signal;

a second control module, configured to receive the third power signal and electrically connected to the second node and the gate of the driving transistor, wherein the second control module is configured to control a potential of the gate of the driving transistor under the control of the potential of the second node, and the third power signal;

a storage module, electrically connected to the gate of the driving transistor and the second end of the light emitting device, wherein the storage module is configured to maintain the potential of the gate of the driving transistor.

Alternatively, in some embodiments of the present application, the first control module comprises a second transistor and a first capacitor;

wherein a gate of the second transistor is configured to receive the control signal, one of a source and a drain of the second transistor is configured to receive the first voltage signal, the other of the source and the drain of the second transistor and one end of the first capacitor are electrically connected to the first node, and another end of the first capacitor is configured to receive the second voltage signal.

Alternatively, in some embodiments of the present application, the bistable circuit module comprises a first inverter and a second inverter;

wherein the first inverter comprises a third transistor and a fourth transistor, a gate of the third transistor and one of a source and a drain of the third transistor are configured to receive the first power signal, the other of the source and the drain of the third transistor and one of a source and a drain of the fourth transistor are electrically connected to the second node, a gate of the fourth transistor is electrically connected to the first node, and the other of the source and the drain of the fourth transistor is configured to receive the third power signal;

wherein the second inverter comprises a fifth transistor and a sixth transistor, a gate of the fifth transistor and one of a source and a drain of the fifth transistor are configured to receive the first power signal, the other of the source and the drain of the fifth transistor and one of a source and a drain of the sixth transistor are electrically connected to the first node, a gate of the sixth transistor is electrically connected to the second node, and the other of the source and the drain of the sixth transistor is configured to receive the third power signal.

Alternatively, in some embodiments of the present application, a channel aspect ratio of the third transistor is less than that of the fourth transistor, and a channel aspect ratio of the fifth transistor is less than that of the sixth transistor.

The present application discloses a light emitting circuit, a backlight module and a display panel. The light emitting circuit comprises a light emitting device, a driving transistor, a data signal writing module, a first control module, a bistable circuit module, and a second control module. The first control module, the bistable circuit module, and the second control module work together to control the potential reversal of the gate of the driving transistor. By setting a bistable circuit module in the light emitting circuit, the present application can quickly change the potential of the gate of the driving transistor, so as to accurately control the luminous time of the light emitting device.

BRIEF DESCRIPTION OF DRAWINGS

In order to explain the technical solutions in the embodiments of the present application more clearly, the following will briefly introduce the drawings needed in the description of the embodiments. Obviously, the drawings in the following description are only some embodiments of the present application. For those skilled in the art, other drawings can be obtained based on these drawings without creative work.

DETAILED DESCRIPTION OF PREFERRED EMBODIMENTS

In the following, the technical scheme in the embodiment of the present application will be described clearly and completely in combination with the drawings. Obviously, the described embodiments are only a part of the embodiments of the present application, rather than all the embodiments. Based on the embodiments of the present application, all other embodiments obtained by those skilled in the art without creative work fall within the protection scope of the present application.

In the description of the present application, it should be understood that the terms "first" and "second" are only used for descriptive purposes and can not be understood as indicating or implying relative importance or implicitly indicating the number of indicated technical features. Thus, the features defining "first" and "second" may explicitly or implicitly include one or more of the features. Therefore, it cannot be understood as a limitation on the present application.

The present application provides a light emitting circuit, a backlight module and a display panel, which are described in detail below. It should be noted that the order of description of the following embodiments is not a limitation of the preferred order of the embodiments of the present application.

Figure 1:
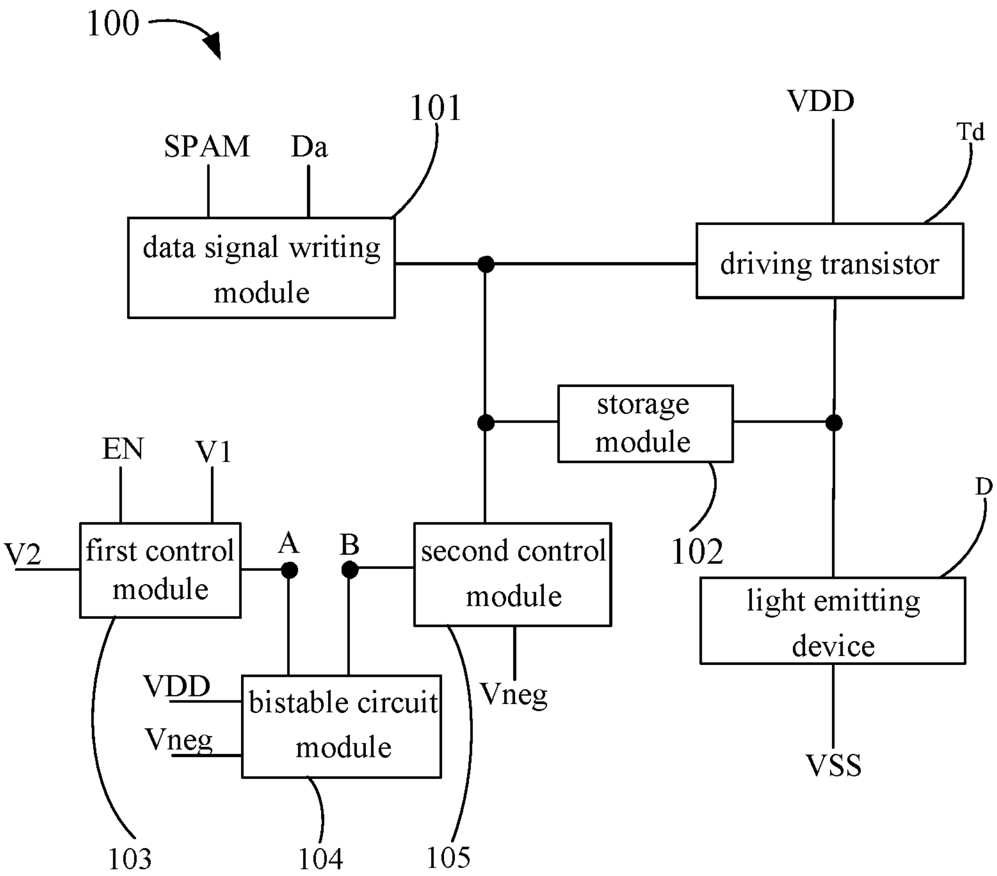
FIG. 1 is a first structural schematic diagram of a light emitting circuit provided by the present application.

Referring to FIG. 1, FIG. 1 is a first structural schematic diagram of a light emitting circuit provided by the present application. The light emitting circuit 100 provided by the present application includes a light emitting device D, a driving transistor Td, a data signal writing module 101, a storage module 102, a first control module 103, a bistable circuit module 104, and a second control module 105.

One of a source and a drain of the driving transistor Td is configured to receive a first power signal VDD. A first end of the light emitting device D is electrically connected to the other of the source and the drain of the driving transistor Td. A second end of the light emitting device D is configured to receive a second power signal VSS.

The data signal writing module 101 is configured to receive a scan signal SPAW and a data signal Da. And the data signal writing module 101 is electrically connected to a gate of the driving transistor Td. The data signal writing module 101 is configured to write the data signal Da to the gate of the driving transistor Td under the control of the scan signal SPAW.

The first control module 103 is configured to receive a control signal EN, a first voltage signal V1, and a second voltage signal V2. And the first control module 103 is electrically connected to a first node A. The first control module 103 is configured to control a potential of the first node A under the control of the control signal EN, the first voltage signal V1, and the second voltage signal V2.

The bistable circuit module 104 is configured to receive the first power signal VDD and a third power signal Vneg. And the bistable circuit module 104 is electrically connected to the first node A and a second node B. The bistable circuit module 104 is configured to control a potential of the second node B under the control of the potential of the first node A, the first power signal VDD, and the third power signal Vneg.

The second control module 105 is configured to receive the third power signal Vneg. And the second control module 105 is electrically connected to the second node B and the gate of the drive transistor Td. The second control module 105 is configured to control the potential of the gate of the driving transistor Td under the control of the potential of the second node B, and the third power signal Vneg.

The memory module 102 is electrically connected to the gate of the drive transistor Td and the second end of the light emitting device D. The memory module 102 is configured to maintain the potential of the gate of the driving transistor Td.

In the light emitting circuit 100 provided in the present application, the first control module 103 controls to change the potential of the first node A. The bistable circuit module 104 can quickly change the potential of the second node B under the control of the potential of the first node A. The second control module 105 rapidly changes the potential of the gate of the drive transistor Td under the control of the potential of the second node B, thereby turning off the drive transistor Td. It can be understood that in the light emitting stage, when the drive transistor Td is turned off, the light emitting device D also stops emitting light. Thus, under the cooperative work of the first control module 103, the bistable circuit module 104, and the second control module 105, the potential of the gate of the driving transistor Td can be quickly changed, so as to accurately control the luminous time of the light emitting device D.

In the present application, both the first power signal VDD and the second power signal VSS are used to output a preset voltage value. In addition, in the present application, a potential of the first power signal VDD is greater than that of the second power signal VSS. Specifically, the potential of the second power signal VSS may be the potential of the ground terminal. Of course, it can be understood that the potential of the second power signal VSS can also be other. It should be noted that the third power signal Vneg can be the same signal as the second power signal VSS or different signals. For example, when the drive transistor Td is a N-type transistor, both the third power signal Vneg and the second power signal VSS can be ground signals. When the drive transistor TD is a P-type transistor, the third power signal Vneg can be a high-level signal.

Figure 2:
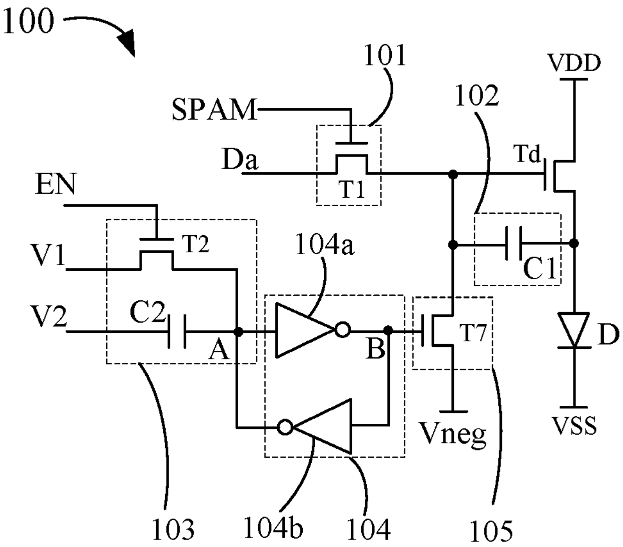
FIG. 2 is a circuit diagram of the light emitting circuit shown in FIG. 1 provided by the present application.

Referring to FIG. 2, FIG. 2 is a circuit diagram of the light emitting circuit shown in FIG. 1 provided by the present application. As shown in FIG. 1 and FIG. 2, in the present application, the data signal writing module 101 includes a first transistor T1. A gate of the first transistor T1 is configured to receive the scan signal SPAW. One of a source and a drain of the first transistor T1 is configured to receive the data signal Da. The other of the source and the drain of the first transistor T1 is electrically connected to the gate of the drive transistor Td. Of course, it can be understood that the data signal writing module 101 can also be arranged by a plurality of transistors in series.

In the present application, the storage module 102 includes a storage capacitor C1. One end of the storage capacitor C1 is electrically connected to the gate of the drive transistor Td. The other end of the storage capacitor C1 is electrically connected to the second end of the light emitting device D.

In the present application, the first control module 103 includes a second transistor T2 and a first capacitor C2. A gate of the second transistor T2 is configured to receive the control signal EN. One of a source and a drain of the second transistor T2 is configured to receive the first voltage signal V1. The other of the source and the drain of the second transistor T2 and one end of the first capacitor C2 are electrically connected to the first node A. The other end of the first capacitor C2 is configured to receive the second voltage signal V2. Of course, the data signal writing module 101 can also adopt a plurality of transistors in series and then be formed in parallel with the first capacitor C2.

It can be understood that the present application sets the second transistor T2 and the first capacitor C2 in the first control module 103. Then, the potential of the first node A is controlled by the control signal EN, the first voltage signal V1, and the second voltage signal V2. This setting does not require the external driver chip to provide sinusoidal pulse width modulation (SPWM) signal with extremely high frequency, and has low requirements for the driver chip.

Figure 3:
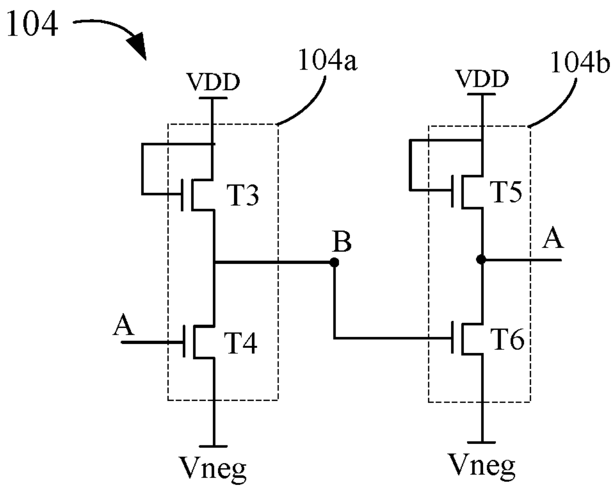
FIG. 3 is a first circuit diagram of a bistable circuit module provided by the present application.

Referring to FIG. 3 of the present application, FIG. 3 is a first circuit diagram of the bistable circuit module provided by the present application. The bistable circuit module 104 includes a first inverter 104*a* and a second inverter 104*b*. The first inverter 104*a* and the second inverter 104*b* are N-metal-oxide-semiconductor (NMOS) inverters.

The first inverter 104*a* includes a third transistor T3 and a fourth transistor T4. A gate of the third transistor T3 and one of a source and a drain of the third transistor T3 are configured to receive the first power signal VDD. The other of the source and the drain of the third transistor T3 and one of a source and a drain of the fourth transistor T4 are electrically connected to the second node B. A gate of the fourth transistor T4 is electrically connected to the first node A. The other of the source and the drain of the fourth transistor T4 is configured to receive the third power signal Vneg.

The second inverter 104*b* includes a fifth transistor T5 and a sixth transistor T6. A gate of the fifth transistor T5 and one of a source and a drain of the fifth transistor T5 are configured to receive the first power signal VDD. The other of the source and the drain of the fifth transistor T5 and one of a source and a drain of the sixth transistor T6 are electrically connected to the first node A. A gate of the sixth transistor T6 is electrically connected to the second node B. The other of the source and the drain of the sixth transistor T6 is configured to receive the third power signal Vneg.

Figure 4A:
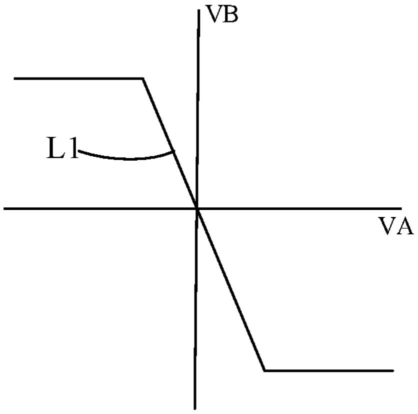
FIGS. 4A-4B are schematic diagrams of voltage changes of a first node and a second node in the bistable circuit module provided by the present application.
Figure 4B:
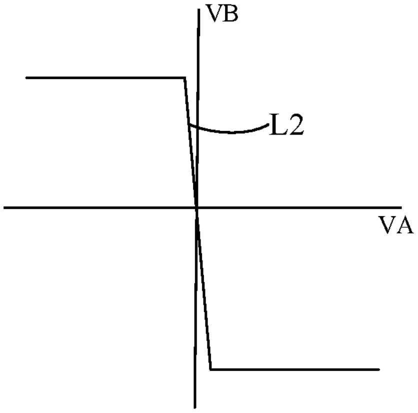

Specifically, please refer to FIGS. 4A-4B. FIGS. 4A-4B are schematic diagrams of voltage changes of a first node and a second node in the bistable circuit module provided by the present application. In FIG. 4A, the curve L1 represents the change relationship between the input voltage and the output voltage of a single inverter. In FIG. 4B, the curve L2 represents the variation relationship between the input voltage and the output voltage of the bistable circuit module 104. That is, the voltage variation relationship between the first node A and the second node B. As shown in FIG. 3 and FIGS. 4A-4B, the state transition of input and output voltage of a single inverter takes a certain time. For the bistable circuit module 104, when the input signal state of the bistable circuit module 104 is converted, the output signal state can be quickly converted.

For example, an initial high potential is given to the first node A through the control signal EN and the first voltage signal V1. Both the third transistor T3 and the fourth transistor T4 are turned on. Since the resistance of the fourth transistor T4 is less than that of the third transistor T3, according to the voltage division principle, the initial potential VB of the second node B is low. When the potential VA of the first node A decreases to a certain value, the fourth transistor T4 is turned off and the third transistor T3 is turned on. At this time, the first power signal VDD is transmitted to the second node B through the third transistor T3, increasing the potential VB of the second node B. After the potential VB of the second node B increases, the fifth transistor T5 and the sixth transistor T6 gradually turn on. Since the resistance of the sixth transistor T6 is less than that of the fifth transistor T5. Therefore, according to the voltage dividing principle, the potential VA of the first node A is a low level, which further reduces the potential VA of the first node A. The potential VA of the first node A is further reduced, making the potential VB of the second node B flip to the high level more quickly. Thus, through the above positive feedback process, the potential VB turnover speed of the second node B is accelerated, so as to obtain a VB output similar to a square wave.

Further, in the first inverter 104*a*, a channel aspect ratio of the third transistor T3 is less than that of the fourth transistor T4.

It is understandable that the resistance of a transistor is related to the size of the device. The larger the channel width length ratio W/L of the transistor, the smaller the resistance under the same conditions. In the first inverter 104*a*, when the potential VA of the first node A is low, the fourth transistor T4 is turned off, the third transistor T3 is turned on, and the potential VB of the second node B is high. When the VA of the first node A is high, both the third transistor T3 and the fourth transistor T4 are turned on. In order to make the potential VB of the second node B low, R (T3)>R (T4), so that when both devices are turned on, the partial voltage on the fourth transistor T4 is small, and the potential VB of the second node B is close to the voltage of the third power signal Vneg. Therefore the potential VB of the second node B.

Similarly, in the second inverter 104*b*, a channel aspect ratio of the fifth transistor T5 is less than that of the sixth transistor T6. Please refer to the above contents for specific analysis, which will not be repeated here.

Of course, it can be understood that in the present application, the first inverter 104*a* and the second inverter 104*b* can also be P-metal-oxide-semiconductor (PMOS) inverters. The working principle of PMOS inverter is similar to that of NMOS inverter and will not be repeated here.

In the present application, the second control module 105 includes a seventh crystal T7. A gate of the seventh transistor T7 is electrically connected to the second node B. One of a source and a drain of the seventh transistor T7 is configured to receive the third power signal Vneg. The other of the source and the drain of the seventh crystal T7 is electrically connected to the gate of the drive transistor Td. Of course, it can be understood that the second control module 105 can also be formed by a plurality of transistors in series.

Figure 5:
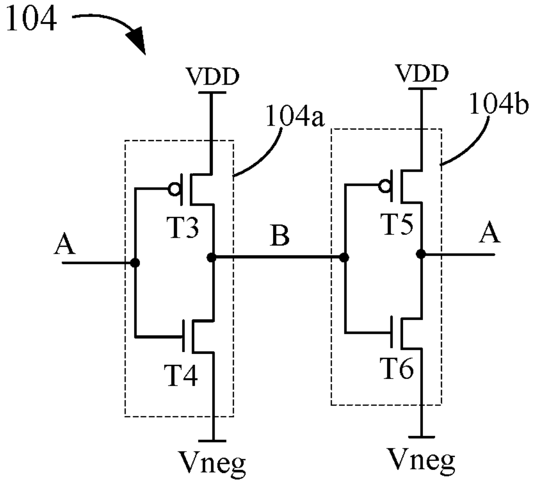
FIG. 5 is a second circuit diagram of the bistable circuit module provided by the present application.

In some embodiments of the present application, please refer to FIG. 5, FIG. 5 is a second circuit diagram of the bistable circuit module provided by the present application. The bistable circuit module 104 includes a first inverter 104*a* and a second inverter 104*b*. The first inverter 104*a* and the second inverter 104*b* are complementary metal oxide semiconductor (CMOS) inverters The first inverter 104*a* includes a third transistor T3 and a fourth transistor T4. A gate of the third transistor T3 and a gate of the fourth transistor T4 are connected to the first node A. One of a source and a drain of the third transistor T3 is configured to receive the first power signal VDD. The other of the source and the drain of the third transistor T3 and one of a source and a drain of the fourth transistor T4 are electrically connected to the second node B. The other of the source and the drain of the fourth transistor T4 is configured to receive the third power signal Vneg.

The second inverter 104*b* includes a fifth transistor T5 and a sixth transistor T6. A gate of the fifth transistor T5 and A gate of the sixth transistor T6 are connected to the second node B. One of a source and a drain of the fifth transistor T5 is configured to receive the first power signal VDD. The other of the source and the drain of the fifth transistor T5 and one of a source and a drain of the sixth transistor T6 are electrically connected to the first node A. The other of the source and the drain of the sixth transistor T6 is configured to receive the third power signal Vneg.

Further, the third transistor T3 and the fifth transistor T5 are P-type transistors. The fourth transistor T4 and the sixth transistor T6 are N-type transistors.

In the first inverter 104*a*, when the potential VA of the first node A is high, the third transistor T3 is turned off and the fourth transistor T4 is turned on. The potential VB of the second node B is high. When the potential VA of the first node A is low, the third transistor T3 is turned on, the fourth transistor T4 is turned off, and the potential VB of the second node B is low. In the second inverter 104*b*, when the potential VB of the second node B is high, the fifth transistor T5 is turned off, the sixth transistor T6 is turned on, and the potential VA of the first node A is low. When the potential VB of the second node B is low, the fifth transistor T5 is turned on, the sixth transistor T6 is turned off, and the potential VA of the first node A is high.

It can be seen that in the first inverter 104*a*, the third transistor T3 and the fourth transistor T4 are time-sharing on. Therefore, it is not necessary to define the resistance of the third transistor T3 and the fourth transistor T4. That is, it is not necessary to define the channel aspect ratio of the third transistor T3 and the fourth transistor T4. Thus, the manufacturing process is simpler. The same is true for the second inverter 104*b*, which will not be repeated here.

The light emitting circuit 100 provided by the present application adopts a luminous circuit with a 7T2C (7 transistors and 2 capacitors) structure to control the light emitting device D. The light emitting circuit 100 uses fewer components, has simple and stable structure and saves cost. In addition, the light emitting circuit 100 has the advantages of high gray-scale segmentation accuracy and low signal requirements for the driving chip. Moreover, since the seventh transistor T7 does not need to go through the process of slow opening, even if the threshold voltage of the seventh transistor T7 at different positions is different, and there is no need to design a compensation circuit for the seventh transistor T7.

In the present application, the drive transistor Td, the first transistor T1, the second transistor T2, the third transistor T3, the fourth transistor T4, the fifth transistor T5, the sixth transistor T6, and the seventh transistor T7 may be one or more of a low-temperature polysilicon thin film transistor, an oxide semiconductor thin film transistor, or an amorphous silicon thin film transistor. In addition, the transistor in the light emitting circuit 100 provided by the present application may also be a P-type transistor or an N-type transistor.

It should be noted that in the following embodiments of the present application, the driving transistor Td, the first transistor T1, the second transistor T2, the third transistor T3, the fourth transistor T4, the fifth transistor T5, the sixth transistor T6, and the seventh transistor T7 are N-type transistors, but they cannot be understood as limiting the present application.

Figure 6:
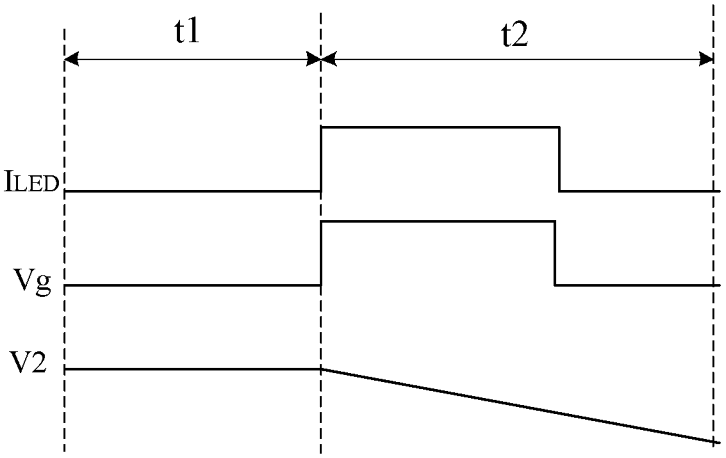
FIG. 6 is a timing diagram of the light emitting circuit shown in FIG. 2 provided by the present application.

Please also refer to FIG. 2, FIG. 3, and FIG. 6. FIG. 6 is a timing diagram of the light emitting circuit shown in FIG. 2 provided by the present application. The combination of the scan signal SPAW, the data signal Da, the control signal EN, the first voltage signal V1, and the second voltage signal V2 successively corresponds to the preparation stage t1 and the light emitting stage t2. That is, within one frame time, the drive control timing of the light emitting circuit 100 shown in FIG. 2 provided by the present application includes a preparation stage t1 and a light emitting stage t2. FIG. 6 shows only a partial signal timing diagram of the light emitting circuit 100 and cannot be understood as a limitation of the present application.

In the preparation stage t1, both the scan signal SPAW and the control signal EN are low. Both the first transistor T1 and the second transistor T2 are turned off. The second voltage signal V2 is high. Through the coupling of the first capacitor C2, the potential of the first node A is high. Both the third transistor T3 and the fourth transistor T4 are turned on. Since the resistance of the fourth transistor T4 is less than that of the third transistor T3, the potential of the second node B is low. The sixth transistor T6 is turned off, the fifth transistor T5 is turned on, and the potential of the first node A remains high.

Meanwhile, the gate potential Vg of the drive transistor Td is low. The drive transistor Td is turned off. The luminous circuit is not conductive. Therefore, the current ILED flowing through the light emitting device D is 0, and the light emitting device D does not emit light. The luminous circuit refers to the path in the light emitting circuit 100 when the light emitting device D emits light.

In the light emission stage t2, the scan signal SPAW changes from low level to high level. The first transistor T1 is turned on. The data signal Da is written to the gate of the drive transistor Td through the first transistor T1 and stored in the storage capacitor C1. The driving transistor Td is turned on, and the first power signal VDD is transmitted to the anode of the light emitting device D through the driving transistor Td. The luminous circuit is turned on and the light emitting device D emits light.

Meanwhile, the control signal EN changes from low level to high level. The second transistor T2 is turned on. The first voltage signal V1 is high. The first voltage signal V1 is transmitted to the first node A through the first transistor T1. The potential of the first node A is high. The second voltage signal V2 is a triangular wave signal. That is, the voltage value of the second voltage signal V2 decreases linearly in the light emission stage t2. Of course, the second voltage signal V2 can also be a signal with other voltage values continuously decreasing, which is not specifically limited in the present application.

As the voltage value of the second voltage signal V2 decreases, the potential of the first node A decreases continuously due to the coupling of the first capacitor C2. When the voltage value of the second voltage signal V2 decreases to a certain value (depending on the threshold voltage of the fourth transistor T4), it can be seen from the above analysis that the potential of the second node B quickly flips from the low level to the high level. The fourth transistor T4 is quickly turned on so that the gate potential of the driving transistor Td is quickly pulled down to the. Then the light emitting device D quickly changes from the light-emitting state to the non-light-emitting state.

It can be understood that since the driving transistor Td is quickly turned off, the light emitting device D quickly changes to a non-light-emitting state, the luminous time of the light-emitting device D can be accurately controlled.

In the present application, the speed of the potential change of the first node A can be controlled by controlling the initial voltage value of the second voltage signal V2, and then the luminous time of the light emitting device D can be controlled. It can be seen from the above analysis that in the initial stage of the light emitting stage t2, the potential of the first node A is high, and the seventh transistor T7 is turned off, which does not affect the gate potential of the driving transistor Td. Only when the potential of the first node A decreases to a certain value, the potential of the second node B quickly flips from the level to the high level. Then, the seventh transistor T7 is turned on to pull down the gate potential of the drive transistor Td. The falling speed of the potential of the first node A depends on the initial voltage value of the second voltage signal V2. Therefore, by controlling the initial voltage value of the second voltage signal V2, the luminous time of the light emitting device D can be controlled. Further, by controlling the luminous time of the light emitting device D, the luminous brightness of the light emitting device D can be controlled, so as to realize some functions such as brightness adjustment, which is not specifically limited in the present application.

Figure 7:
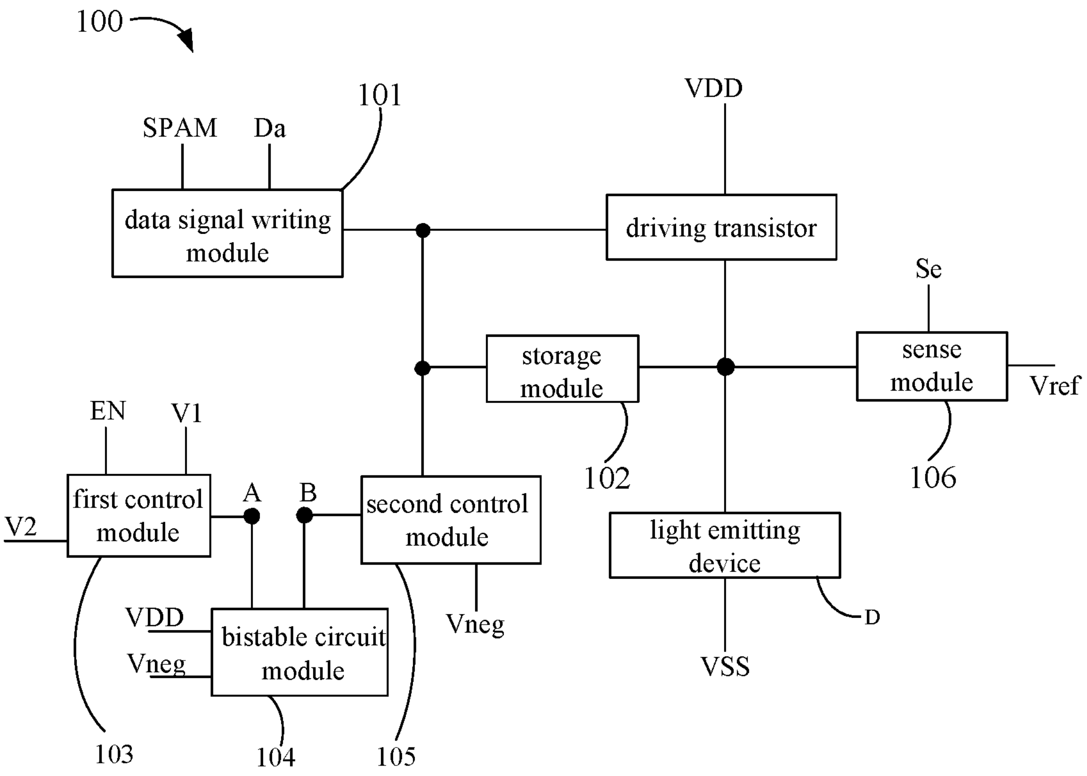
FIG. 7 is a second structural schematic diagram of a light emitting circuit provided by the present application.

Please refer to FIG. 7. FIG. 7 is a second structural schematic diagram of a light emitting circuit provided by the present application. The difference from the light emitting circuit 100 shown in FIG. 1 is that in the present embodiment, the light emitting circuit 100 also includes a sensing module 106. The sensing module 106 is configured to receive a sense signal Se and is electrically connected to one of the source and the drain of the driving transistor Td and the initial voltage input terminal Vref. The sensing module 106 is configured to sense the threshold voltage of the driving transistor Td under the control of the sense signal Se.

Figure 8:
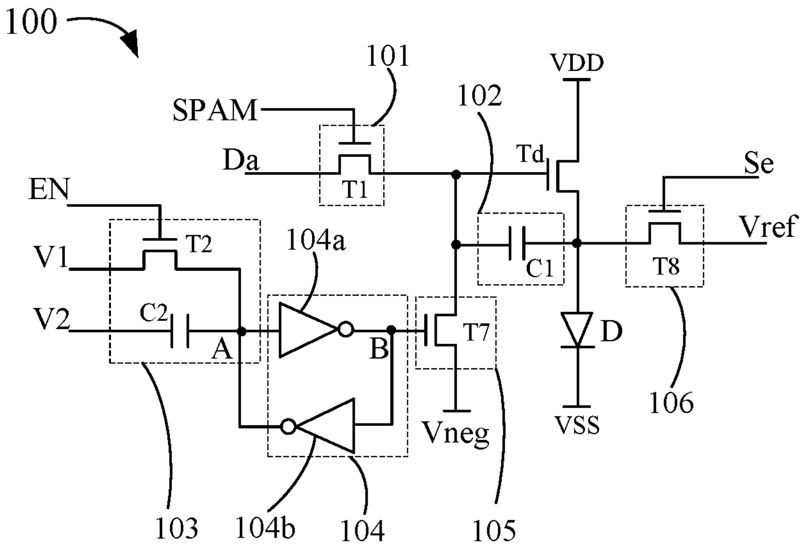
FIG. 8 is a circuit diagram of the light emitting circuit shown in FIG. 7 provided by the present application.

Further, FIG. 8 is a circuit diagram of the light emitting circuit shown in FIG. 7 provided by the present application. The sensing module 106 includes an eighth transistor T8. A gate of the eighth transistor T8 is configured to receive the sense signal Se. One of a source and a drain of the eighth transistor T8 is electrically connected to the other of the source and the drain of the driving transistor Td. The other of the source and the drain of the eighth transistor T8 is electrically connected to the initial voltage input terminal Vref. The eighth transistor T8 may be a N-type transistor or a P-type transistor. Of course, it is understandable that the sensing module 106 can also be arranged by a plurality of transistors in series.

In this embodiment, by setting the sensing module 106 in the light emitting circuit 100 and adopting the principle of external compensation, the threshold voltage detection stage can be inserted according to the demand in one frame display cycle of the light emitting circuit 100 to realize the function of threshold voltage compensation, so as to improve the luminous brightness uniformity of multiple light emitting devices D.

It should be noted that in some embodiments of the present application, an internal compensation circuit can be added to the light emitting circuit 100 to compensate the threshold voltage of the driving transistor TD. In some embodiments of the present application, a light emitting control module may also be added to the light emitting circuit 100. The light emitting control module is connected with the light emitting control signal and connected in series to the luminous circuit. The light emitting control module is configured to control the conduction of the luminous circuit under the control of the light emitting control signal to prevent the light emitting device D from emitting light in the non-light-emitting stage. That is, the first control module 103, the bistable circuit module 104 and the second control module 105 in the light emitting circuit 100 provided by the present application can be applied to various types of light-emitting circuits, which will not be repeated here.

Figure 9:
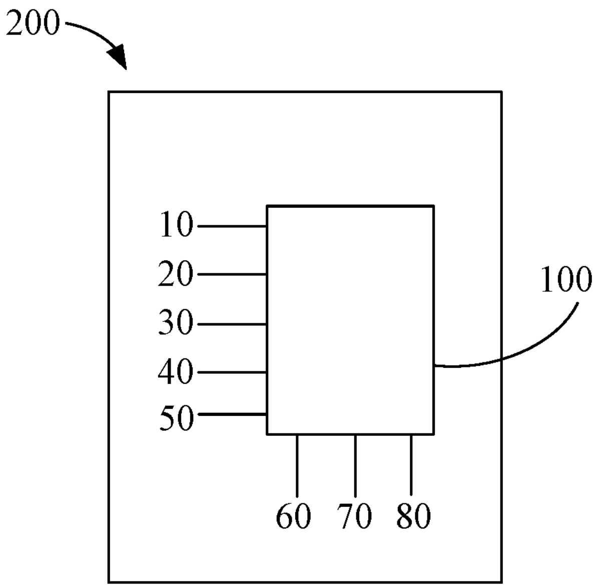
FIG. 9 is a structural schematic diagram of a backlight module provided by the present application.

Please refer to FIG. 9. FIG. 9 is a structural schematic diagram of a backlight module provided by the present application. The embodiment of the present application also provides a backlight module 200, which includes a data line 10, a scan line 20, a control line 30, a first signal line 40, a second signal line 50, a first power line 60, a second power line 70, a third power line 80, and the light emitting circuit 100 described in any of the above embodiments. The data line 10 is configured to provide a data signal. The scan line

20 is configured to provide a scan signal. The control line 30 is configured to provide a control signal. The first signal line 40 is configured to provide a first voltage signal. The second signal line 50 is configured to provide a second voltage signal. The first power line 60 is configured to provide a first power signal. The second power line 70 is configured to provide a second power signal. The third power line 80 is configured to provide a third power signal. The light emitting circuit 100 is electrically connected to the data line 10, the scanning line 20, the control line 30, the first signal line 40, the second signal line 50, the first power line 60, the second power line 70, and the third power 80, respectively. The light emitting circuit 100 can refer to the above description of the light emitting circuit 100, which will not be repeated here.

Specifically, in the light emitting circuit 100, one of the source and the drain of the driving transistor is electrically connected to the first power line 60. The second end of the light emitting device D is electrically connected to the second power line 70. The data signal writing module 101 is electrically connected with the data line 10 and the scan line 20. The first control module 103 is electrically connected to the control line 30, the first signal line 40, and the second signal line 50. The bistable circuit module 104 is electrically connected to the first power line 60 and the third power line 80. The second control module 105 is electrically connected to the third power line 80.

A novel light emitting circuit 100 is used in the backlight module 200 provided by the present application. The light emitting circuit 100 includes a light emitting device, a driving transistor, a data signal writing module, a first control module, a bistable circuit module, and a second control module. The first control module, the bistable circuit module, and the second control module work together, which can quickly change the potential of the gate of the driving transistor, accurately control the luminous time of the light emitting device, and improve the light source quality of the backlight module 200.

Figure 10:
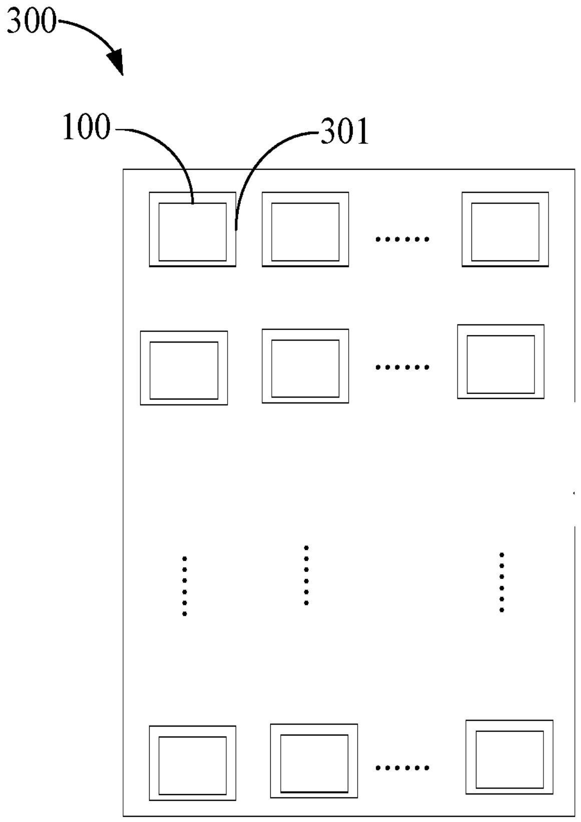
FIG. 10 is a structural schematic diagram of a display panel provided by the present application.

Please refer to FIG. 10. FIG. 10 is a structural schematic diagram of a display panel provided by the present application. The embodiment of the present application also provides a display panel 300, which includes a plurality of pixel units 301 arranged in an array. And each pixel unit 301 includes the light emitting circuit 100 described above. For details, please refer to the above description of the light emitting circuit 100 and will not be repeated here.

A novel light emitting circuit 100 is used in the display panel 300 provided by the present application. The light emitting circuit 100 includes a light emitting device, a driving transistor, a data signal writing module, a first control module, a bistable circuit module, and a second control module. The first control module, the bistable circuit module, and the second control module work together to quickly change the potential of the gate of the driving transistor, so as to accurately control the luminous time of the light emitting device. Thus, the display screen of the display panel 300 is improved.

The application has been described by the relevant embodiments, however, the above embodiments are only examples of the implementation of the present invention. It must be noted that the disclosed embodiments do not limit the scope of the present invention. On the contrary, the modification and equalization of the spirit and scope included in the claims are included in the scope of the invention.

What is claimed is:

1. A light emitting circuit, comprising:

a driving transistor, wherein one of a source and a drain of the driving transistor is configured to receive a first power signal;

a light emitting device, comprising a first end electrically connected to the other of the source and the drain of the driving transistor, wherein a second end of the light emitting device is configured to receive a second power signal;

a data signal writing module, configured to receive a scan signal and a data signal and electrically connected to a gate of the driving transistor, wherein the data signal writing module is configured to write the data signal to the gate of the driving transistor under a control of the scan signal;

a first control module, configured to receive a control signal, a first voltage signal, and a second voltage signal and electrically connected to a first node, wherein the first control module is configured to control a potential of the first node under a control of the control signal, the first voltage signal, and the second voltage signal;

a bistable circuit module, configured to receive the first power signal and a third power signal and electrically connected to the first node and a second node, wherein the bistable circuit module is configured to control a potential of the second node under a control of the potential of the first node, the first power signal, and the third power signal;

a second control module, configured to receive the third power signal and electrically connected to the second node and the gate of the driving transistor, wherein the second control module is configured to control a potential of the gate of the driving transistor under a control of the potential of the second node, and the third power signal; and a storage module, electrically connected to the gate of the driving transistor and the second end of the light emitting device, wherein the storage module is configured to maintain the potential of the gate of the driving transistor.

2. The light emitting circuit of claim 1, wherein the data signal writing module comprises a first transistor, a gate of the first transistor is configured to receive the scan signal, one of a source and a drain of the first transistor is configured to receive the data signal, and the other of the source and the drain of the first transistor is electrically connected to the gate of the driving transistor;

wherein, the storage module comprises a storage capacitor, an end of the storage capacitor is electrically connected to the gate of the driving transistor, and another end of the storage capacitor is electrically connected to the second end of the light emitting device.

3. The light emitting circuit of claim 1, wherein the first control module comprises a second transistor and a first capacitor;

wherein a gate of the second transistor is configured to receive the control signal, one of a source and a drain of the second transistor is configured to receive the first voltage signal, the other of the source and the drain of the second transistor and one end of the first capacitor are electrically connected to the first node, and another end of the first capacitor is configured to receive the second voltage signal.

4. The light emitting circuit of claim 1, wherein the bistable circuit module comprises a first inverter and a second inverter;

wherein the first inverter comprises a third transistor and a fourth transistor, a gate of the third transistor and one of a source and a drain of the third transistor are configured to receive the first power signal, the other of the source and the drain of the third transistor and one of a source and a drain of the fourth transistor are electrically connected to the second node, a gate of the fourth transistor is electrically connected to the first node, and the other of the source and the drain of the fourth transistor is configured to receive the third power signal;

wherein the second inverter comprises a fifth transistor and a sixth transistor, a gate of the fifth transistor and one of a source and a drain of the fifth transistor are configured to receive the first power signal, the other of the source and the drain of the fifth transistor and one of a source and a drain of the sixth transistor are electrically connected to the first node, a gate of the sixth transistor is electrically connected to the second node, and the other of the source and the drain of the sixth transistor is configured to receive the third power signal.

5. The light emitting circuit of claim 4, wherein a channel aspect ratio of the third transistor is less than that of the fourth transistor, and a channel aspect ratio of the fifth transistor is less than that of the sixth transistor.

6. The light emitting circuit of claim 1, wherein the bistable circuit module comprises a first inverter and a second inverter;

wherein the first inverter comprises a third transistor and a fourth transistor, a gate of the third transistor and a gate of the fourth transistor are electrically connected to the first node, and one of a source and a drain of the third transistor is configured to receive the first power signal, the other of the source and the drain of the third transistor and one of a source and a drain of the fourth transistor are electrically connected to the second node, and the other of the source and the drain of the fourth transistor is configured to receive the third power signal;

wherein the second inverter comprises a fifth transistor and a sixth transistor, a gate of the fifth transistor and a gate of the sixth transistor are electrically connected to the second node, and one of a source and a drain of the fifth transistor is configured to receive the first power signal, the other of the source and the drain of the fifth transistor and one of a source and a drain of the sixth transistor are electrically connected to the first node, and the other of the source and the drain of the sixth transistor is configured to receive the third power signal;

wherein the third transistor and the fifth transistor are P-type transistors, and the fourth transistor and the sixth transistor are N-type transistors.

7. The light emitting circuit of claim 1, wherein the second control module comprises a seventh transistor, wherein a gate of the seventh transistor is electrically connected to the second node, one of a source and a drain of the seventh transistor is configured to receive the third power signal, and the other of the source and the drain of the seventh transistor is electrically connected to the gate of the driving transistor.

8. The light emitting circuit of claim 1, wherein the light emitting circuit further comprises a sensing module configured to receive a sense signal and electrically connected to the other of the source and the drain of the driving transistor and an initial voltage input terminal, wherein the sensing module is configured to sense a threshold voltage of the driving transistor under a control of the sense signal.

9. The light emitting circuit of claim 8, wherein the sensing module comprises an eighth transistor, wherein a gate of the eighth transistor is configured to receive the sense signal, one of a source and a drain of the eighth transistor is electrically connected to one of the source and the drain of the driving transistor, and the other of the source and the drain of the eighth transistor is electrically connected to the initial voltage input terminal.

10. The light emitting circuit of claim 1, wherein the second voltage signal is a triangular wave signal.

11. A backlight module, comprising:

a data line for providing a data signal;

a scan line for providing a scan signal;

a control line for providing a control signal;

a first signal line for providing a first voltage signal;

a second signal line for providing a second voltage signal;

a first power line for providing a first power signal;

a second power line for providing a second power signal;

a third power line for providing a third power signal; and a light emitting circuit, comprising:

a driving transistor, wherein one of a source and a drain of the driving transistor is configured to receive the first power signal;

a light emitting device, comprising a first end electrically connected to the other of the source and the drain of the driving transistor, wherein a second end of the light emitting device is configured to receive the second power signal;

a data signal writing module, configured to receive the scan signal and the data signal and electrically connected to a gate of the driving transistor, wherein the data signal writing module is configured to write the data signal to the gate of the driving transistor under a control of the scan signal;

a first control module, configured to receive the control signal, the first voltage signal, and the second voltage signal and electrically connected to a first node, wherein the first control module is configured to control a potential of the first node under the control of a control signal, the first voltage signal, and the second voltage signal;

a bistable circuit module, configured to receive the first power signal and the third power signal and electrically connected to the first node and a second node, wherein the bistable circuit module is configured to control a potential of the second node under a control of the potential of the first node, the first power signal, and the third power signal;

a second control module, configured to receive the third power signal and electrically connected to the second node and the gate of the driving transistor, wherein the second control module is configured to control a potential of the gate of the driving transistor under a control of the potential of the second node, and the third power signal; and a storage module, electrically connected to the gate of the driving transistor and the second end of the light emitting device, wherein the storage module is configured to maintain the potential of the gate of the driving transistor.

12. The backlight module of claim 11, wherein the data signal writing module comprises a first transistor, a gate of the first transistor is configured to receive the scan signal, one of a source and a drain of the first transistor is configured to receive the data signal, and the other of the source and the drain of the first transistor is electrically connected to the gate of the driving transistor;

wherein, the storage module comprises a storage capacitor, an end of the storage capacitor is electrically connected to the gate of the driving transistor, and another end of the storage capacitor is electrically connected to the second end of the light emitting device.

13. The backlight module of claim 11, wherein the first control module comprises a second transistor and a first capacitor;

wherein a gate of the second transistor is configured to receive the control signal, one of a source and a drain of the second transistor is configured to receive the first voltage signal, the other of the source and the drain of the second transistor and one end of the first capacitor are electrically connected to the first node, and another end of the first capacitor is configured to receive the second voltage signal.

14. The backlight module of claim 11, wherein the bistable circuit module comprises a first inverter and a second inverter;

wherein the first inverter comprises a third transistor and a fourth transistor, a gate of the third transistor and one of a source and a drain of the third transistor are configured to receive the first power signal, the other of the source and the drain of the third transistor and one of a source and a drain of the fourth transistor are electrically connected to the second node, a gate of the fourth transistor is electrically connected to the first node, and the other of the source and the drain of the fourth transistor is configured to receive the third power signal;

wherein the second inverter comprises a fifth transistor and a sixth transistor, a gate of the fifth transistor and one of a source and a drain of the fifth transistor are configured to receive the first power signal, the other of the source and the drain of the fifth transistor and one of a source and a drain of the sixth transistor are electrically connected to the first node, a gate of the sixth transistor is electrically connected to the second node, and the other of the source and the drain of the sixth transistor is configured to receive the third power signal.

15. The backlight module of claim 14, wherein a channel aspect ratio of the third transistor is less than that of the fourth transistor, and a channel aspect ratio of the fifth transistor is less than that of the sixth transistor.

16. The backlight module of claim 11, wherein the bistable circuit module comprises a first inverter and a second inverter;

wherein the first inverter comprises a third transistor and a fourth transistor, a gate of the third transistor and a gate of the fourth transistor are electrically connected to the first node, and one of a source and a drain of the third transistor is configured to receive the first power signal, the other of the source and the drain of the third transistor and one of a source and a drain of the fourth transistor are electrically connected to the second node, and the other of the source and the drain of the fourth transistor is configured to receive the third power signal;

wherein the second inverter comprises a fifth transistor and a sixth transistor, a gate of the fifth transistor and a gate of the sixth transistor are electrically connected to the second node, and one of a source and a drain of the fifth transistor is configured to receive the first power signal, the other of the source and the drain of the fifth transistor and one of a source and a drain of the sixth transistor are electrically connected to the first node, and the other of the source and the drain of the sixth transistor is configured to receive the third power signal;

wherein the third transistor and the fifth transistor are P-type transistors, and the fourth transistor and the sixth transistor are N-type transistors.

17. A display panel, comprising a plurality of pixel units arranged in an array, wherein, each pixel unit comprises a light emitting circuit, and the light emitting circuit comprises:

a driving transistor, wherein one of a source and a drain of the driving transistor is configured to receive a first power signal;

a light emitting device, comprising a first end electrically connected to the other of the source and the drain of the driving transistor, wherein a second end of the light emitting device is configured to receive a second power signal;

a data signal writing module, configured to receive a scan signal and a data signal and electrically connected to a gate of the driving transistor, wherein the data signal writing module is configured to write the data signal to the gate of the driving transistor under a control of the scan signal;

a first control module, configured to receive a control signal, a first voltage signal, and a second voltage signal and electrically connected to a first node, wherein the first control module is configured to control a potential of the first node under a control of the control signal, the first voltage signal, and the second voltage signal;

a bistable circuit module, configured to receive the first power signal and a third power signal and electrically connected to the first node and a second node, wherein the bistable circuit module is configured to control a potential of the second node under a control of the potential of the first node, the first power signal, and the third power signal;

a second control module, configured to receive the third power signal and electrically connected to the second node and the gate of the driving transistor, wherein the second control module is configured to control a potential of the gate of the driving transistor under a control of the potential of the second node, and the third power signal; and a storage module, electrically connected to the gate of the driving transistor and the second end of the light emitting device, wherein the storage module is configured to maintain the potential of the gate of the driving transistor.

18. The display panel of claim 17, wherein the first control module comprises a second transistor and a first capacitor;

wherein a gate of the second transistor is configured to receive the control signal, one of a source and a drain of the second transistor is configured to receive the first voltage signal, the other of the source and the drain of the second transistor and one end of the first capacitor are electrically connected to the first node, and another end of the first capacitor is configured to receive the second voltage signal.

19. The display panel claim 17, wherein the bistable circuit module comprises a first inverter and a second inverter;

wherein the first inverter comprises a third transistor and a fourth transistor, a gate of the third transistor and one of a source and a drain of the third transistor are configured to receive the first power signal, the other of the source and the drain of the third transistor and one of a source and a drain of the fourth transistor are electrically connected to the second node, a gate of the fourth transistor is electrically connected to the first node, and the other of the source and the drain of the fourth transistor is configured to receive the third power signal;

wherein the second inverter comprises a fifth transistor and a sixth transistor, a gate of the fifth transistor and one of a source and a drain of the fifth transistor are configured to receive the first power signal, the other of the source and the drain of the fifth transistor and one of a source and a drain of the sixth transistor are electrically connected to the first node, a gate of the sixth transistor is electrically connected to the second node, and the other of the source and the drain of the sixth transistor is configured to receive the third power signal.

20. The display panel of claim 19, wherein a channel aspect ratio of the third transistor is less than that of the fourth transistor, and a channel aspect ratio of the fifth transistor is less than that of the sixth transistor.

* * * * *